United States Patent [19]

Weman

[11] 4,293,105
[45] Oct. 6, 1981

[54] BI-LEVEL WEB SENSITIVE RETRACTOR

[75] Inventor: Per O. Weman, Heverlee, Belgium

[73] Assignee: Allied Chemical Corporation, Morris Township, Morris County, N.J.

[21] Appl. No.: 907,427

[22] Filed: May 19, 1978

Related U.S. Application Data

[63] Continuation of Ser. No. 753,764, Dec. 23, 1976, abandoned.

[51] Int. Cl.$^3$ ...................... B65H 75/48; A62B 35/00
[52] U.S. Cl. ............................. 242/107.4 B; 280/806; 297/475; 297/478
[58] Field of Search ................. 242/107.4 B; 280/806, 280/803; 297/478, 475, 476

[56] References Cited

U.S. PATENT DOCUMENTS

| | | | |
|---|---|---|---|
| 3,741,496 | 6/1973 | Beller | 242/107.4 B |
| 3,797,603 | 3/1974 | Loomba | 280/806 X |
| 3,817,473 | 6/1974 | Board et al. | 297/476 X |
| 3,822,046 | 7/1974 | Baelder | 242/107.4 B |
| 3,862,726 | 1/1975 | Ulrich | 242/107.4 B |
| 3,865,329 | 2/1975 | Higbee et al. | 242/107.4 B |
| 3,926,385 | 12/1975 | Board et al. | 297/476 X |

FOREIGN PATENT DOCUMENTS 2337877  3/1974  Fed. Rep. of Germany  242/107.4 B
2442379  4/1975  Fed. Rep. of Germany ...... 297/478

Primary Examiner—James T. McCall
Attorney, Agent, or Firm—Roger H. Criss

[57] ABSTRACT

A reel type safety seat belt retractor in which a pawl is triggered to engage a ratchet wheel, serving as a reel flange, by an inertial device sensitive to an accelerated movement of the reel, wherein the inertial device has two levels of sensitivity, a low level to prevent the triggering of the pawl under all normal conditions of belt withdrawal for buckling, and a second level of high sensitivity which prevails after the belt webbing has been buckled about the passenger.

This is accomplished by means of a biasing spring shared by both a webbing follower and the inertial device, and by a clutch which rotated when the webbing in initially withdrawn to restrain the webbing follower and the attached spring bias in a condition of high tension for the low level of sensitivity. When the clutch rotates to release the webbing follower as the belt is buckled, the follower moves toward the diminished roll of webbing, reducing the tension on the shared spring bias and providing a high level of sensitivity for the protection of the buckled passenger.

7 Claims, 5 Drawing Figures

BI-LEVEL WEB SENSITIVE RETRACTOR

CROSS-REFERENCE TO RELATED APPLICATIONS

This is a continuation of application Ser. No. 753,764, filed Dec. 23, 1976, now abandoned.

BACKGROUND OF THE INVENTION

1. Field of the Invention

This invention relates to vehicle safety belt retractors and more particularly to those which permit withdrawal of the seat belt for buckling or to accommodate the body movements of the individual using the belt, but which lock to restrain the wearer when conditions require it in the interests of safety.

2. Description of the Prior Art

Many reel-type safety seat belt retractors are known which employ an inertial device for triggering a pawl into locking engagement with the ratchet teeth on the reel in response to neccelerated rotation of the reel in the unwind direction. Also different methods have been suggested for permitting the belt to be withdrawn for belting without activating the inertial device. This is commonly accomplished by designing the inertial device to respond only to relatively high rates of acceleration of the reel. This entails a compromise between sensitivity and convenience, often to the detriment of both.

Retractors have been suggested wherein the sensitivity of the triggering device gradually increases as the webbing -S withdrawn, being related to the amount of webbing extended. The suggested methods are usually complex, expensive to manufacture, and add to the possibility of retractor failure. Electrical and hydraulic methods of achieving a change in sensitivity related to the amount of webbing extended, are known. It is a characteristic of this arrangement, that the further the belt is withdrawn for buckling, the greater the chance that the locking mechanism will be inadvertently triggered. It also follows that the sensitivity would be greater for a stout person than for a slim person or child.

It is an object of this invention to provide a safety seat belt retractor in which the locking of the reel of webbing is triggered by an inertial sensing device having two levels of sensitivity, a low level which is in effect when the user withdrawn the webbing for buclking up, at which time the triggering of the locking mechanism would be an unneccessary annoyance; and a high level of sensitivity which prevails after the user is buckled up, and a ready response to any sudden accelerating motion of the reel is required to protect the user. It is also an object of this invention to achieve this bi-level sensitivity simply, without complicated and expensive additional structures.

SUMMARY OF THE INVENTION

The present invention is directed to a safety seat belt retractor having a rotatable reel to which a seat belt is attached. The reel is journaled in a support adapted for attachment to the frame of a vehicle. The reel has as a flange, at least one ratchet wheel biased in the wind direction, and a pawl adapted to engage the ratchet wheel in the unwind direction in response to the action of an inertial device sensitive to an accelerating rate of rotation of the reel.

The novelty of the retractor of my invention lies in the fact that the inertial device has two levels of sensitivity. There is a low level of sensitivity by which applies when the webbing is first withdrawn for buckling, to avoid the annoyance of having the locking mechanism triggered inadvertently as the webbing is being withdrawn for buckling. Locking of the reel would then only occur should the belt be withdrawn with unusual vigor. The second level is one of high sensitivity, and prevails after the user has buckled up, and is dependent on the sensitivity of the retractor should he become involved in a collision.

There are many different types of inertial devices. One of the most common and effective, and the one preferred in the retractor of my invention, consists of an inertial wheel with an attached pinion which is concentric thereto. The frame in which this wheel is journaled is rotatable about the shaft of the reel which extends through the sidewall of the support. At the end of this shaft there is a gear with which the pinion of the inertial wheel meshes. An arm of the rotatable frame encompasses an arm of the pawl bar making controlling contact to move the pawl bar toward or away from the ratchet wheel. The rotatable frame is biased to maintain the bar out of engagement with the ratchet wheels. When the webbing is extended to buckle the passenger, and extends and retracts with the ordinary body movements of the passenger, the gear meshed with the pinion turns the inertial wheel without moving the frame in which it is journaled, because of the spring bias. On the other hand, if the passenger lurches forward, as would be the case were the vehicle involved in a collision, the inertial wheel, in accordance with Newton's laws of motion, would resist change, and the gear would "walk" up the pinion, causing the frame to rotate to a limited degree, moving the pawl bar into locking engagement with the ratchet wheel.

Several factors effect the sensitivity of the inertial sensing device, such as the weight and dimension of the inertial wheel and the relative diameters of the driving gear and pinion. These factors are fixed, but the biasing means such as a spring is also an important factor. The strength of the spring and its degree of extension are important, the latter factor being one that can be readily altered.

In most inertial devices of this type, one end of the spring is attached to the support wall or to a pin extending therefrom. The other end is attached to the rotatable frame of the inertial device, and several openings for the attachment of the spring are usually provided so that the sensitivity of the inertial device can be adjusted to meet the local requirements. The greater the tension on the spring, the less sensitive the sensing element becomes.

In the retractor of my invention, one end of the biasing spring is, as usual, attached to the rotatable frame of the inertial device, but the other, rather than being attached to the sidewall, is attached to the end of a webbing follower which slides in a groove in the near side wall of the support. This groove goes from a point in or near the edge of the sidewall toward the point of spring attachment on the rotatable frame. The other end of this webbing follower pivots in the opposite sidewall, and a portion of the follower extends toward the reel and is biased toward the reel for sliding contact therewith. This bias is supplied by the same spring that provides bias for the rotatable frame of the inertial device, thus both webbing follower and inertial device share the same biasing spring. When the reel of webbing is substantially full, therefore, the shared biasing spring is under considerable tension, rendering the inertial device relatively insensitive to an accelerating rate of rotation of the reel in the unwind direction. When the roll of webbing on the reel has been substantially diminished by the withdrawal of webbing from the retractor, the bias becomes slight, rendering the inertial device more sensitive to an accelerating rate of retation of the reel in the unwind direction.

This improvement, without any additional structure, provides a continuous change of sensitivity, with the sensitivity greatest as the webbing is extended. However, the retractor of my invention has additionally, a clutch positioned for limited retation with the ratchet wheel. The clutch is sandwiched between the ratchet wheel and the side wall of the support, and is biased toward the ratchet wheel for rotation therewith. The clutch has an arm extending in the general direction of the webbing follower and is of such a length, that it can rotate beneath the webbing follower when the webbing follower is held against its bias by a substantially full roll of webbing on the reel. The length of the arm of the clutch, however, is also such that it cannot pass beneath the webbing follower when the follower has moved toward the reel in response to a diminishing roll of webbing. Therefore, when the webbing is initially withdrawn for buckling, the arm of the clutch rotates beneath the webbing follower, and a further projection on the arm strickes the webbing follower, thus positioning the extended arm beneath the webbing follower and halting further rotation of the clutch in the unwind direction. This position of the arm prevents the follower from remaining in sliding contact with the diminished roll of webbing, and maintains the shared biasing spring extended in a relatively high degree of tension. When, however, in buckling, the webbing is permitted to retract slightly, as normally occurs during the buckling operation, the clutch rotates in the winding direction sufficient to release the webbing follower. The webbing follower then, in response to its bias, moves toward the diminished roll of webbing, reducing the tension of the shared spring bias and increasing the sensitivity of the inertial device to any accelerating rate of rotation of the reel in the unwind direction.

In my reference to "webbing", I mean any form of safety belt or strap that may be employed.

DETAILED DESCRIPTION OF THE PREFERRED EMBODIMENT WITH REFERENCE TO THE DRAWINGS

Figure 1:
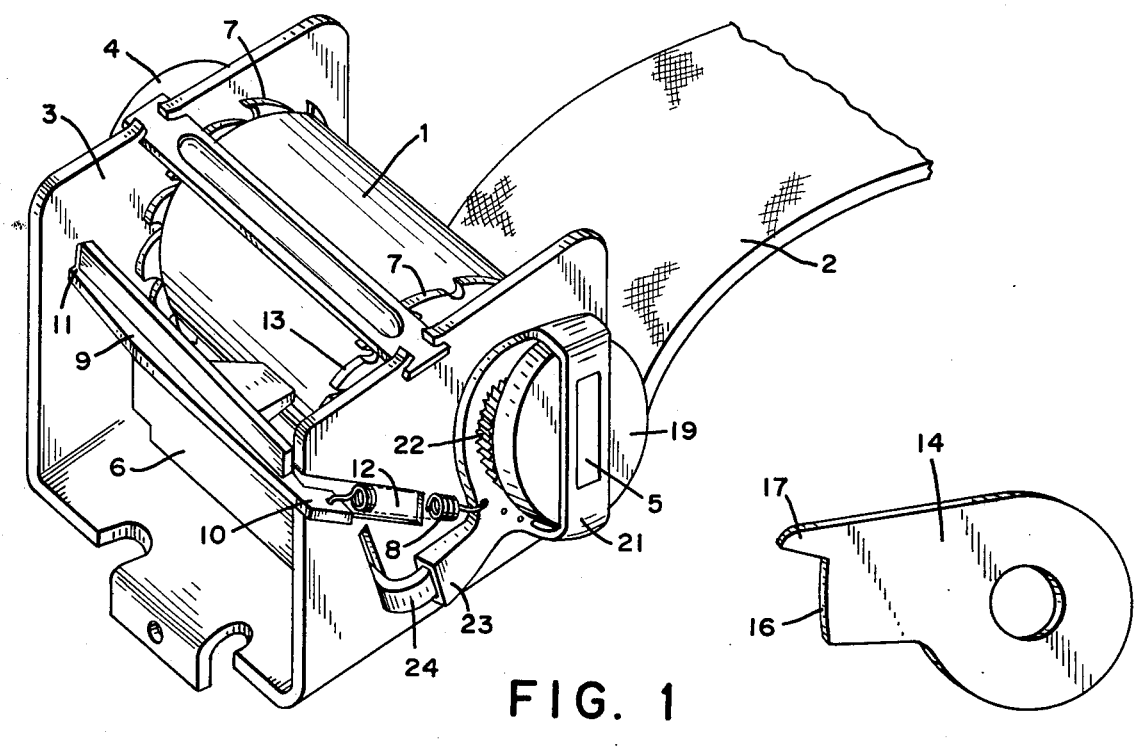
FIG. 1 is a perspective drawing of the bi-level, web sensitive safety seat belt retractor showing the spring biased webbing follower, the spring of which also provides a variable bias to the inertial device, thus serving a double purpose.
Figure 2:
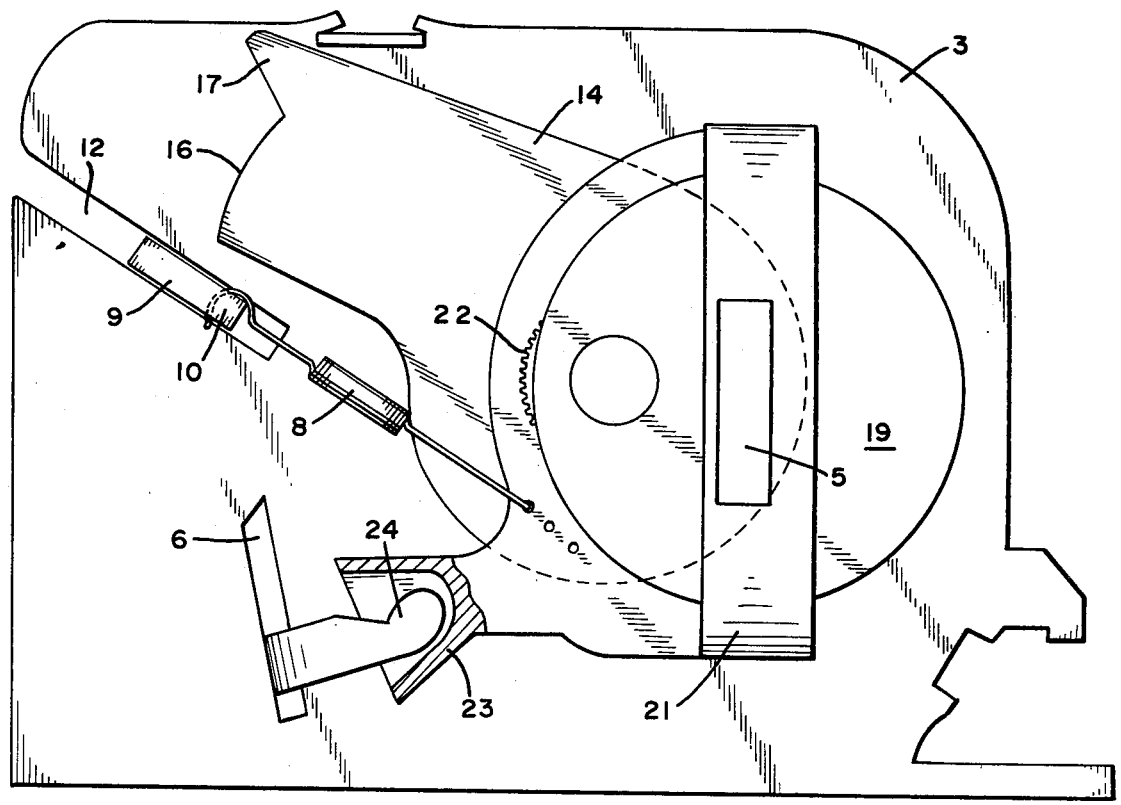
FIG. 2 is an enlarged diagramatic representation in part, of the retractor showing the relation of the clutch to the webbing follower, and the manner in which the sensitivity of the inertial device is altered by the position of the webbing follower.
Figure 3:
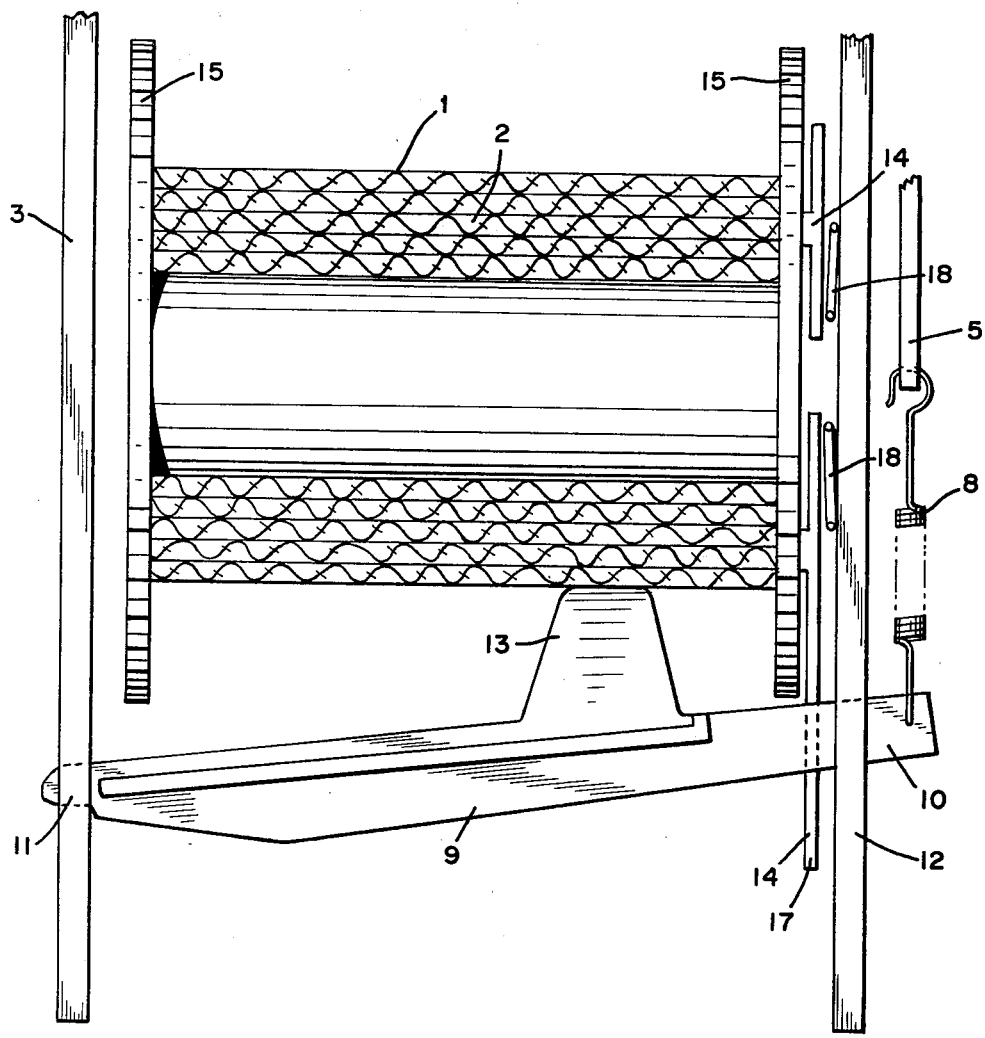
FIG. 3 is an enlarged diagramatic representation in part, of the retractor as seen from the top, to further illustrate the action of the biased webbing follower and its relation to the clutch and the inertial device.

With reference to FIGS. 1, 2 and 3, my invention is directed to a seat belt retractor of the type having a flanged rotatable reel 1 for belt webbing 2 journaled in a support wall 3, and spring biased toward a fully wound condition by biasing means 4. An extension of the reel shaft connects to an inertial device 5 for tripping the locking pawl bar 6 into locking engagement with ratchet teeth 7 on the periphery of the flanges of the webbing reel 1, when a sudden pull is applied to webbing 2.

The inertial device is sensitive to a sudden increase in the rate of acceleration of the reel in the unwind direction.

A novel feature of this seat belt retractor is the additional structure provided to permit the webbing to be withdrawn from the retractor for buckling without the annoyance of having the reel lock in response to inertial device 5, no matter how far the belt is extended on the first pull, and no matter how rapidly it is manually withdrawn. I say "manually", bacause the pawl and ratchet can still engage, if the acceleration is as great as would be encountered in a collision, where the webbing was suddenly subjected to an acceleration in the order of 3 g's or more. This feature insures that the retractor would act to restrain a passenger even if for some reason the mechanism was blocked from behaving in the manner intended.

The ability of the retractor to permit withdrawal of the webbing without normally triggering the locking mechanism is made possible by increasing the bias applied to the inertial device by biasing means 8 during this period of initial withdrawal of the webbing. This is achieved by attaching a spring to the inertial device and the other end, which in retractors of the prior art is generally fixed on the support, to a movable webbing follower 9.

When the reel is substantially full of webbing as when the webbing is initially withdrawn, the distance subtended by the spring is at a maximum, thus maximizing the degree of applied bias, and greatly reducing the sensitivity of the inertial device to any accelerated rate of withdrawal of the webbing. As the diameter of the roll of webbing is substantially reduced with the withdrawal of the belt, the webbing follower, a portion of which is in sliding contact with the surface of the roll of webbing, moves toward the shaft of the reel, and in so doing, lessens the distance subtended by the spring, between the inertial device and the webbing follower, thus reducing the bias and making the inertial device more sensitive and responsive. The material of construction of this webbing follower 9, is not critical, but nylon or Teflon is preferred, said follower preferably being shaped for strength and rigidity. The webbing follower of FIGS. 1, 2 and 3 extends into an opening 11 in the side support wall most distant from the inertial device 5. The side support wall most distant from the inertial device 5. The webbing follower extends beyond the opposite wall, with its end 10 extending through slot 12 which starts at the outer edge of the support wall and slopes in the direction of that part of the inertial device to which the biasing spring 8 is attached. The other end of spring 8 is attached to the end of the webbing follower that extends beyond slot 12, thus biasing the follower toward the reel. The end of the follower in the slot can easily slide in the slot in a line either toward or away from the inertial device. Preferably the slot is lined with a polymeric material such as nylon or Teflon to increase the ease of slippage of the end of the webbing follower within said slot.

A portion 13 of the webbing follower extends toward the roll of webbing on the reel for sliding contact therewith. With this arrangement it can be seen that, as the webbing is withdrawn, the sensitivity of the inertial device to any sudden extension of the webbing, increases. In other words, initially, the webbing can be withdrawn with little danger of triggering the locking mechanism, but the further the webbing is extended, the greater becomes the chance of triggering the locking mechanism. To forestall such an eventuality, the retractor of this invention also has a clutch 14 which is rotatable on the shaft of the reel, and is positioned between the sidewall of the support and the face of the adjacent toothed reel flange 15 hereinafter called the ratchet wheel. The clutch 14 is biased against the ratchet wheel for rotation therewith. The clutch has an extending arm having an outer edge 16, preferably shaped as an arc segment having approximately the radius as measured from its curved surface to the center of the shaft. This outer edge is at such a distance from the shaft of the reel that it can pass beneath the webbing follower 9 when said follower is restrained outwardly against its bias 8 by a substantially full roll of webbing on the reel, but said outer edge is at a distance from the shaft such that it cannot pass beneath the webbing follower when the roll of webbing on the reel has been appreciably reduced as a result of the belt having been withdrawn for buckling. Although the shape of the outer edge of the extending arm of the clutch is preferably that of an arc segment, actually this outer edge can be a step, shoulder, or any shape which behaves in the manner described. Adjacent to this arc segment, and positioned to follow the arc segment as the clutch rotates in the unwind direction, is a projection 17, extending beyond the arc segment to a distance such that it cannot rotate beneath the webbing follower in any of its positions, thus when the webbing is first withdrawn, the arc segment 16 of the clutch rotates beneath the webbing follower 9, and is held there when the projection or stop strikes the webbing follower, halting further rotation of the clutch, the surface of which is then in sliding contact with the ratchet wheel. As more webbing is withdrawn from the reel, the arm of the clutch retains the webbing follower in a fixed position, with the biasing spring extended. This maintains the inertial device in a condition of low sensitivity.

While the belt webbing is buckled about the user, however, the webbing is normally retracted slightly, and to a sufficient degree as to rotate the arc segment away from its position beneath the webbing follower. The webbing follower then springs forward to contact the diminished roll of webbing and in so doing reduces the bias of the spring attached to the inertial device, thus greatly increasing its sensitivity to any sudden extension of the webbing.

The clutch 14 is not visible in the retractor as shown in FIG. 1, but is placed beside it. Its relation to the webbing follower is clearly shown in the drawing of FIG. 2.

The retractor is termed "bi-level web sensitive" because of its low sensitivity to the acceleration of the reel when the webbing follower 9 is held stationary by clutch 14 when the webbing is first withdrawn, and its high sensitivity when the user is buckled up. The clutch has in this case released the webbing follower to move toward the reel, thereby reducing the tension on biasing spring 8, and producing the high level of sensitivity to any sudden extension of the webbing.

FIG. 3 represents the webbing follower in its released position wherein the inertial device is highly sensitive and readily responsive.

The clutch 8 is shown in FIG. 3 with biasing spring 18 pressing it in contact with ratchet wheel 15.

Figure 4:
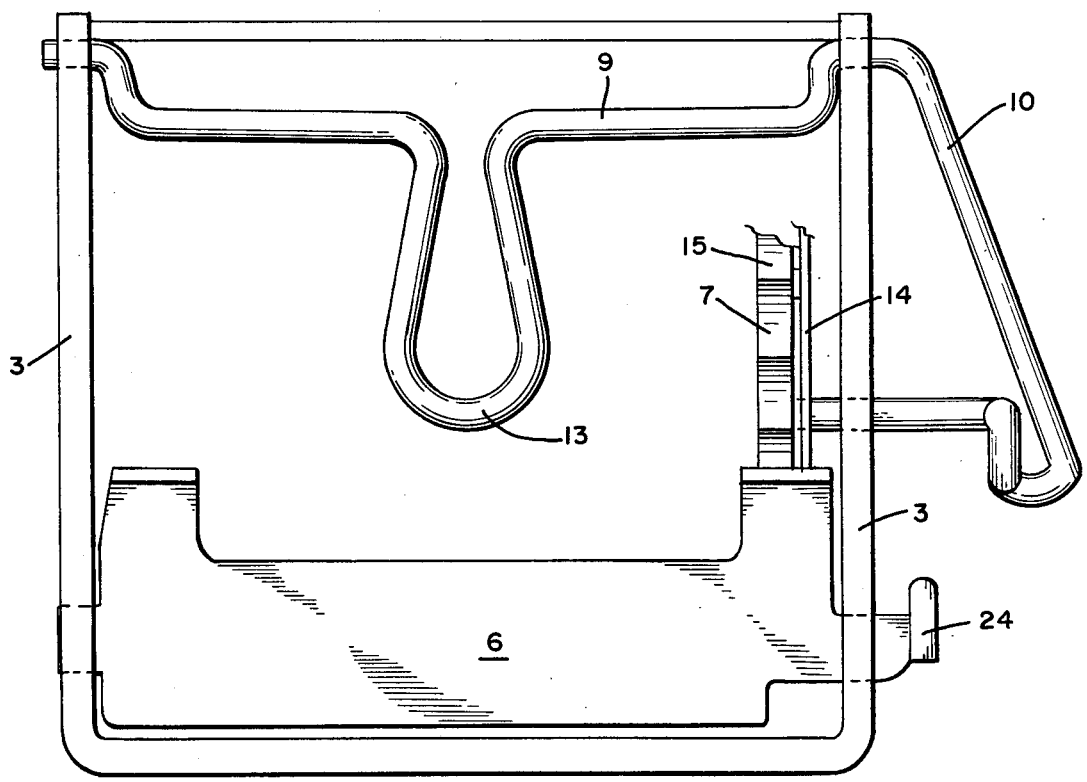
FIG. 4 is another enlarged diagramatic representation in part, of the retractor as seen from the front end wherein the pawl bar is located. A variation of the webbing follower is shown swinging downward from the top of the support walls of the retractor.

FIG. 4 illustrates a different type of webbing follower, this one journaled in the sidewalls near the top of the support frame. Being constructed of rod, it has a central loop 13 for sliding contact with the roll of webbing. The controlling end of this webbing follower passes through a slot in the support wall for cooperation with the clutch in substantially the same manner as the webbing follower of FIG. 2.

Figure 5:
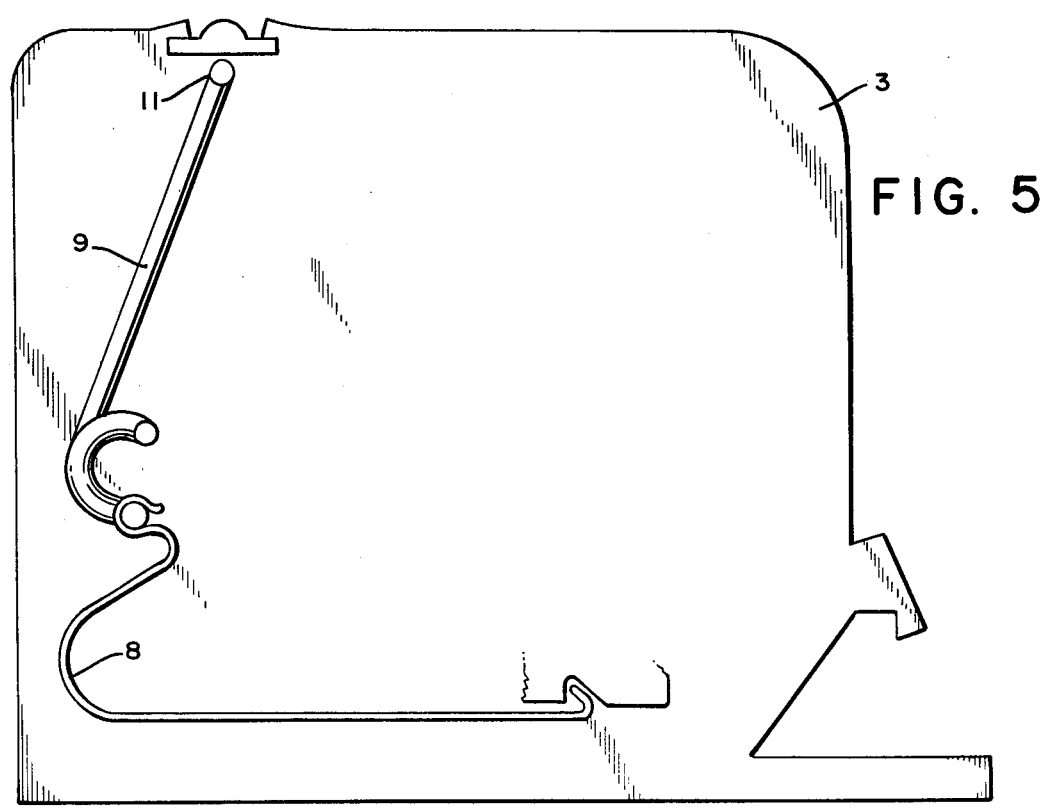
FIG. 5 is still another enlarged diagramatic representation in part, illustrating the manner in which the webbing follower of drawing 4 may, if desired, be biased by a leaf spring rather than a coiled spring.

Although a spiral spring can be used with this version of the webbing follower, FIG. 5 shows the manner in which a leaf spring could serve as well.

There are many varieties of webbing followers and biasing means that could be adapted for use in the safety belt retractor of my invention.

To summarize the action of the retractor: as the webbing is initially withdrawn for buckling, the spring 8 is extended because the substantially full roll of webbing on the reel presses the webbing follower outwardly, at a considerable distance from the inertial device to which it is connected by this spring 8. Also, in manually withdrawing the webbing, the clutch is immediately rotated by its contact with the ratchet wheel, so that its arc segment 16 passes under the webbing follower where it comes to reset as stop 17 strikes the webbing follower. The high level of tension is therefore maintained by the extended spring 8, even after the roll of webbing diminishes in diameter as the webbing is withdrawn. The inertial device, now having a low level of sensitivity, does not normally annoy the user by triggering the locking mechanism as the webbing is withdrawn.

In the buckling operation, the user inadvertently allows the webbing to retract slightly. Only a slight movement of the reel in the rewind direction is necessary to rotate the arc segment 16 free of its position beneath the webbing follower to respond to its bias and move toward the reel. The spring 8 therefore contracts. But the spring is shared by the inertial device 5 which now becomes highly sensitive to any sudden acceleration of the reel in the unwind direction, so that if the passenger lurches forward as would be the case in a collision, the inertial device triggers the locking mechanism and the webbing restrains the passenger.

In our drawing the preferred inertial device comprises an inertial wheel 19 journaled into a light frame 21 which is rotatable about the shaft of the reel. Gear 22 is keyed to the shaft. As the reel rotates, this gear, which meshes with a pinion attached to the inertial wheel, turns the wheel. If the motion of the reel is moderate, such as would be produced by the normal body motion of a belted passenger, any slight tendency for the frame 21 to rotate, is thwarted by the bias of spring 8. If the passenger suddenly lurches against the webbing, however, the inertia of the inertial wheel 19 offers enough resistance to immediate rotation to cause the gear 22 to "walk up" the pinion. Since the pinion with attached inertial wheel is journaled in the rotatable frame, and off-center with respect to the point of rotation of the frame, the inertial device rotates counter clockwise. It can be seen in FIG. 2, that the encompassing arm 23 of the inertial device will then rock the extended arm 24 of the pawl bar, and thus rock the pawl bar 6 into locking engagement with the ratchet wheel 15, causing the webbing to restrain the buckled passenger.

While I have described the preferred embodiments of my invention, it will be understood that various modifications can be made in the seat belt retractor without departing from the spirit of the invention.

I claim:

1. In a safety belt retractor having a rotatable reel to which a seat belt is attached, said reel being journaled in a support adapted for attachment to the frame of a vehicle, said reel having as a flange at least one ratchet wheel, said reel being biased in the wind direction, and a pawl adapted to engage the ratchet wheel in the unwind direction in response to the action of an inertial device sensitive to an accelerating rate of rotation of the reel, to halt rotation of the reel, the improvement which ocmprises: a webbing follower sharing the biasing means with the inertial device, whereby, when the reel of webbing is substantially full, the shared biasing means is under considerable tension, rendering the inertial device relatively insensitive to an accelerating rate of rotation of the reel in the unwind direction, and when the roll of webbing on the reel has been substantially diminished by the withdrawal of webbing from the retractor, the bias in slight, rendering the inertial device more sensitive to an accelerating rate of rotation of the reel in the unwind direction.

2. In a safety belt retractor having a rotatable reel to which a seat belt is attached, said reel being journaled in a support adapted for attachment to the frame of a vehicle, said reel having as a flange at least one ratchet wheel, said reel being biased in the wind direction, and a pawl adapted to engage the ratchet wheel in the unwind direction in response to the action of an inertial device sensitive to an accelerating rate of rotation of the reel, the improvement which comprises: a webbing follower joined to the inertial device by a biasing spring, and a clutch positioned for limited rotation with the ratchet wheel, said clutch having an arm extending in the general direction of the webbing follower, said arm being of such a length as to allow it to rotate beneath the webbing follower when said webbing follower is held outwardly by a substantially full roll of webbing on the reel, but that said arm cannot pass beneath the webbing follower when said webbing follower has moved toward the reel in response to a diminishing roll of webbing, whereby, when the webbing is initially withdrawn for buckling, the arm of the clutch rotates beneath the webbing follower, preventing the follower from remaining in sliding contact with the diminished roll of webbing and maintaining the shared biasing spring extended and tensed, but when in buckling by a passenger, the webbing is permitted to retract slightly, as normally occurs during the buckling operation, the clutch rotates in the winding direction sufficiently to release the webbing follower, which, in response to its bias, moves toward the diminished roll of webbing, reducing the tension of the shared spring and increasing the sensitivity of the inertial device to an accelerating rate of rotation of the reel in the unwind direction.

3. A safety seat belt retractor adapted for use with a seat belt in a vehicle, said retractor comprising:

(a) a support having a base adapted for attachment to the frame of a vehicle, two substantially parallel side walls, said side walls having openings for the components of the belt retractor, including a pawl bar;

(b) a reel assembly adapted for connection to a seat belt, said reel having a shaft for a roll of seat belt webbing to be wound upon, said reel being journaled in the parallel side walls of the support for rotation in a winding direction, and in the opposite unwind direction, said reel assembly having at least one circular ratchet wheel having ratchet teeth on its periphery for engagement with the pawl bar upon rotation of the reel in the direction to unwind the belt;

(c) biasing means connected to the support and to the shaft, urging said shaft to rotate in its winding direction;

(d) an arm, being an integral part of the pawl bar, extending through the support wall;

(e) a normally stationary, movable inertial device biased toward its normally stationary position, the inertial device being in controlling contact with the movable arm of the pawl bar to move the pawl into locking engagement with the ratchet wheel in response to an accelerating rate of rotation of the shaft;

(f) a webbing follower comprising an elongated member being substantially parallel to the shaft, and having a portion extending toward the roll of webbing on the reel for sliding contact therewith, said webbing follower having one end pivoted in the sidewall of the support opposite the wall through which the movable arm of the pawl extends, with the other end of the follower slideably arranged in, and protruding beyond, a slot, extending from the edge of the side wall toward the inertial device, said webbing follower being biased toward the roll of webbing;

(g) the biasing means of the webbing follower and the biasing means of the inertial device being one, shared by both structures, whereby when a substantially full roll of webbing holds the webbing follower outwardly against its bias, the biasing effect on the inertial device is at a maximum, substantially reducing the sensitivity of the inertial device;

(h) a clutch, sandwiched between the ratchet wheel and the adjacent support wall, said clutch being in contact with, and biased toward, the surface of the ratchet wheel, to rotate therewith about the shaft, said clutch having an arm extending in the direction of the webbing follower of a length such that when the webbing follower is extended outwardly by a substantially full roll of webbing on the reel, the arm of the clutch can rotate beneath it, thereby preventing the webbing follower from moving toward the reel as the roll of webbing is substantially diminished upon withdrawal of the webbing from the retracter; but said arm also being of such a length that it cannot rotate beneath the webbing follower when the webbing follower has moved toward the reel in response to its bias, when the roll of webbing is substantially diminished; whereby, when the belt is first withdrawn for buckling, the extended arm of the clutch rotates beneath the webbing follower and restrains it from following the roll of webbing as it diminishes; the biasing spring shared by the webbing follower and inertial device is thus extended and tensed, rendering the inertial device insensitive, but as the passenger buckles up, a slight retraction of the webbing normally takes place, the arm of the clutch rotates away from its position beneath the webbing follower, which then moves forward in response to its bias, toward the diminished roll of webbing, simultaneously reducing the bias of the inertial device which thereupon becomes sensitive to any further accelerated movement of the reel in the unwind direction.

4. The seat belt retractor of claim 3 in which the spring bias shared by the webbing follower and the inertial device. is a leaf spring.

5. The seat belt retractor of claim 3 in which the outer edge of the arm of the clutch that contacts the webbing follower is an arc segment, the radius of which is measured from that surface to the center of the shaft about which the clutch rotates, the radius being less than the distance of the webbing follower from the center of the shaft when said webbing follower is in sliding contact with a substantially full roll of webbing, but more than the distance of the webbing follower from the center of the shaft when said webbing follower is in sliding contact with less than a full roll of webbing.

6. The seat belt retractor of claim 5 wherein the arm of the clutch has a projection serving as a stop, which follows the arc segment as the clutch moves in the unwind direction, said stop being positioned to strike the webbing follower when the clutch is rotated in the unwind direction, halting the rotation of said clutch with the arc segment beneath the webbing follower, whereby, the arc segment of the clutch restrains the webbing follower from following the diminishing roll of webbing on the reel as the webbing is withdrawn therefrom.

7. In a safety belt retractor having a rotatable reel on which a belt is rolled, locking means responsive to an inertial device, said inertial device responsive to an accelerating rate of rotation of the reel, to stop rotation of the reel, the improvement which comprises: a web follower, a biasing means attached to said web follower and to said inertial device, whereby, when the reel is substantially full of rolled belt, the biasing means is under a first predetermined amount of tension, rendering the inertial device less sensitive to an accelerating rate of rotation of the reel in the unwind direction, and when the roll of belt on the reel has been substantially diminished by the withdrawal of belt from the retractor, the bias means is under a second predetermined amount of tension which is less than said first predetermined amount of tension, rendering the inertial device more sensitive to an accelerating rate of rotation of the reel in the unwind direction.

* * * * *